United States Patent
Ginthoer

(10) Patent No.: US 11,411,818 B2
(45) Date of Patent: Aug. 9, 2022

(54) METHOD AND APPARATUS FOR A COMMUNICATION NETWORK

(71) Applicant: Robert Bosch GmbH, Stuttgart (DE)

(72) Inventor: David Osamu Ginthoer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/471,429

(22) Filed: Sep. 10, 2021

(65) Prior Publication Data

US 2022/0078080 A1     Mar. 10, 2022

(30) Foreign Application Priority Data

Sep. 10, 2020   (EP) ..................................... 20195416

(51) Int. Cl.
*G06F 15/173*     (2006.01)
*H04L 41/0823*    (2022.01)
*H04L 67/12*      (2022.01)

(52) U.S. Cl.
CPC .......... *H04L 41/0823* (2013.01); *H04L 67/12* (2013.01)

(58) Field of Classification Search
CPC .......................... H04L 41/0823; H04L 41/122; H04L 62/1002
See application file for complete search history.

(56) References Cited

U.S. PATENT DOCUMENTS

| | | | |
|---|---|---|---|
| 2020/0120536 A1* | 4/2020 | Prakash | H04L 47/24 |
| 2020/0137615 A1* | 4/2020 | Joseph | H04W 8/245 |
| 2020/0267785 A1* | 8/2020 | Talebi Fard | H04L 45/04 |

FOREIGN PATENT DOCUMENTS

WO     2020035133 A1     2/2020

* cited by examiner

*Primary Examiner* — Thanh T Nguyen
(74) *Attorney, Agent, or Firm* — Michael Best & Friedrich LLP

(57) ABSTRACT

A method of configuring a network entity that involves receiving a plurality of cyclic data stream parameters and associated QoS requirements, wherein at least one of the plurality of stream parameters characterizes at least a frame arrival of an associated cyclic data stream and associated communication endpoints of a communications network; receiving first capability information characterizing a capability of respective wired links of the communications network; receiving second capability information characterizing a capability of respective wireless links of the communications network; and determining a pre-schedule based on the plurality of cyclic data stream parameters, the associated QoS requirements, the first network capability information (ci1 #1-3), and the second capability information (ci2 #4-5).

16 Claims, 4 Drawing Sheets

METHOD AND APPARATUS FOR A COMMUNICATION NETWORK

BACKGROUND OF THE INVENTION

With Industry 4.0, wireless communication is finding its way onto the shop floor in a large scale. Bringing highly flexible networks and vertical integration to the factory, future manufacturing will be extremely customizable and highly efficient. However, the flexibility comes at the price of increased complexity in managing such a network, especially if stringent QoS requirements must be met as in many industrial real-time applications. In wired communication systems, such as Time-sensitive Networking (TSN), end-to-end service guarantees, like bounded latency, are achieved by scheduling each user and apply traffic-shaping mechanisms (e.g. time-aware shaping).

SUMMARY OF THE INVENTION

According to a first aspect of the description, a method comprises: receiving a plurality of cyclic data stream parameters and associated QoS requirements, wherein at least one of the plurality of stream parameters characterizes at least a frame arrival of an associated cyclic data stream and associated communication endpoints of a communications network; receiving first capability information characterizing a capability of respective wired links of the communications network; receiving second capability information characterizing a capability of respective wireless links of the communications network; determining a pre-schedule based on the plurality of cyclic data stream parameters, the associated QoS requirements, the first network capability information, and the second capability information; and configuring at least one network entity of the communications network based on the determined at least one pre-schedule.

Advantageously, a suitable pre-schedule over a heterogeneous network consisting of a wired TSN and a wireless network is determined. The different constraints are given by the respective system and the approach allows an optimization of each data stream in an end-to-end fashion.

An advantageous example is characterized in that the determining of the pre-schedule comprises: selecting successively at least one segment of the communications network based on the first network capability information, and the second capability information; and determining at least one preliminary instance of the pre-schedule for the selected one of the segments of the communications network based on the plurality of cyclic data stream parameters, the associated QoS requirements associated with the first segment.

Advantageously, the network segments allow a faster calculation of the pre-schedule when compared to a calculation of the pre-schedule for the whole network at once.

An advantageous example is characterized in that the firstly selected segment comprises the wireless or the wired links, and wherein the second segment comprises the wired or the wireless links.

Advantageously, this separation can be determined by the respective link property.

An advantageous example is characterized in that the selection of the firstly selected segment comprises: determining a plurality of current usages associated with the wired and wireless links based on the provided first and second capability information; determining the first selected segment comprising a plurality of connected ones of the links with the associated current usage above a usage threshold.

If a segment of the network is under high load of real-time cross-traffic, an optimized pre-schedule of this segment for low latency is determined first, as it will be the bottleneck in the communications network for the considered end-to-end cyclic data streams.

An advantageous example is characterized in that the selection of the firstly selected segment comprises: determining a plurality of bandwidths of the wired and wireless links based on the provided first and second capability information; determining the firstly selected segment comprising a plurality of connected ones of the links with the associated bandwidths below a bandwidth threshold.

If one of the network segments has significantly lower bandwidth available than the rest of the communications network, an optimization of resource efficiency is beneficial in order to prevent other users to starve.

An advantageous example is characterized in that the pre-schedule comprises at least one gate control list associated with a network entity serving at least one of the wired links of the communications network.

Advantageously, the at least one gate control list is determined in dependence on the second capability information characterizing a capability of respective wireless links of the communications network.

An advantageous example is characterized in that the pre-schedule comprises at least an expected cyclic traffic amount per time unit and per wireless link for a scheduler entity configured to schedule at least one network entity serving at least one of the wireless links of the communications network.

Advantageously, the expected cyclic traffic amount per time unit and per wireless link is determined in dependence on the first capability information characterizing a capability of respective wired links.

An advantageous example is characterized in that the pre-schedule comprises the at least one gate control list for the at least one wired links of a network translator entity and the expected cyclic traffic amount per time unit and per wireless link for the scheduler entity configured to schedule the network translator entity serving at least one of the wireless links associated with the network translator entity.

Advantageously, the network translator entity is pre-scheduled centrally via the pre-schedule.

According to a second aspect of the description, an apparatus is provided that comprises: receiving means to receive a plurality of cyclic data stream parameters and associated QoS requirements, wherein at least one of the plurality of stream parameters characterizes at least a frame arrival of an associated cyclic data stream and associated communication endpoints of a communications network; receiving means to receive first capability information characterizing a capability of respective wired links of the communications network; receiving means to receive second capability information characterizing a capability of respective wireless links of the communications network; determining means to determine a pre-schedule based on the plurality of cyclic data stream parameters, the associated QoS requirements, the first network capability information, and the second capability information; and configuring means to configure at least one network entity of the communications network based on the determined at least one pre-schedule.

An advantageous example is characterized in that determining means for determining the pre-schedule comprises: selecting means to select successively at least one segment of the communications network based on the first network capability information, and the second capability information; determining means to determine at least one preliminary instance of the pre-schedule for the selected one of the segments of the communications network based on the plurality of cyclic data stream parameters, the associated QoS requirements associated with the first segment.

An advantageous example is characterized in that the firstly selected segment comprises the wireless or the wired links, and wherein the second segment comprises the wired or the wireless links.

An advantageous example is characterized in that the selection of the firstly selected segment comprises: determining a plurality of current usages associated with the wired and wireless links based on the provided first and second capability information; determining the first selected segment comprising a plurality of connected ones of the links with the associated current usage above a usage threshold.

An advantageous example is characterized in that the selection means for selecting the firstly selected segment comprises: determining means to determine a plurality of bandwidths of the wired and wireless links based on the provided first and second capability information; determining means to determine the firstly selected segment comprising a plurality of connected ones of the links with the associated bandwidths below a bandwidth threshold.

An advantageous example is characterized in that the pre-schedule comprises at least one gate control list associated with a network entity serving at least one of the wired links of the communications network.

An advantageous example is characterized in that the pre-schedule comprises at least an expected cyclic traffic amount per time unit and per wireless link for a scheduler entity configured to schedule at least one network entity serving at least one of the wireless links of the communications network.

An advantageous example is characterized in that the pre-schedule comprises the gate control list for the at least one wired links of a network translator entity and the expected cyclic traffic amount per time unit and per wireless link for the scheduler entity configured to schedule the network translator entity serving at least one of the wireless links associated with the network translator entity.

Another aspect of the description is directed to a use of the method according to the first aspect or of the apparatus according to the second aspect.

DETAILED DESCRIPTION

Figure 1:
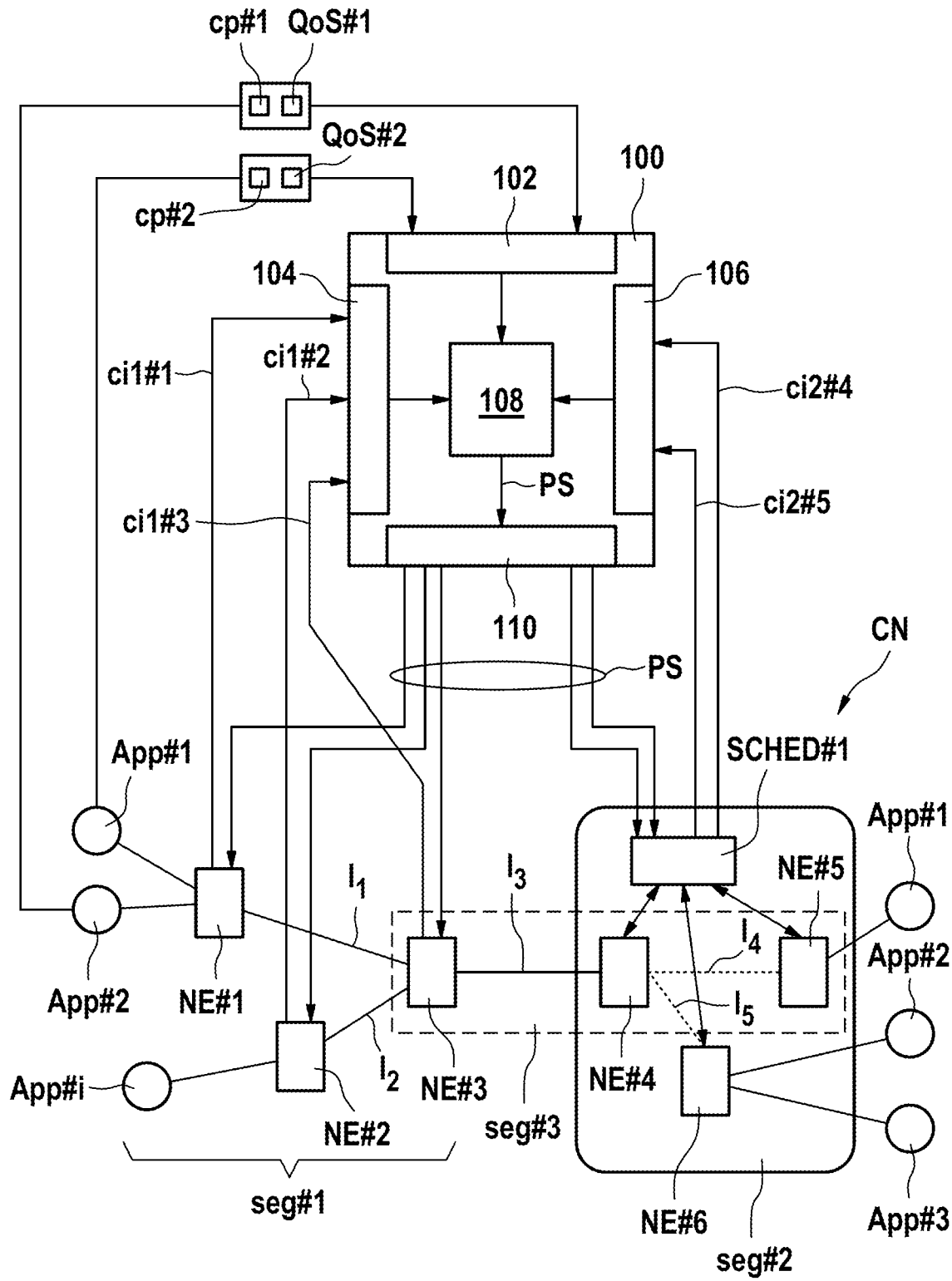
FIG. 1 depicts schematically a communications network and an apparatus for determining a pre-schedule for the communications network.

FIG. 1 depicts schematically a communications network CN and an apparatus 100 for determining a pre-schedule PS for the communications network CN. The exemplary communications network CN consisting of TSN and 5G-based TSN network entities.

The apparatus 100 comprises receiving means to receive 102 a plurality of cyclic data stream parameters cp #1, cp #2 and associated QoS requirements QoS #1, QoS #2. At least one of the plurality of stream parameters cp #1, cp #2 characterizes at least a frame arrival of an associated cyclic data stream, associated frame size, and associated communication endpoints App #1, App #2, App #i of the communications network CN. The endpoint App #1, App #2, App #i represent real-time applications like industrial control applications or the like being executed on or directly linked to a respective one of the network entities NE #1-6 of the communications network CN.

The apparatus 100 comprises receiving means or a receiving interface to receive 104 first capability information ci1 #1-3 characterizing a capability of respective wired links 11, 12, 13 of the communications network CN.

The apparatus 100 comprises receiving means to receive 106 second capability information ci2 #4-5 characterizing a capability of respective wireless links 13, 15 of the communications network CN.

According to an example, the capability information ci2 is information about the current channel condition per user or network entity NE #4-6. This information can be considered in the end-to-end scheduling. For example, a better resilience against higher and also inconsistent resource demands of users is achieved even under impaired channel conditions by scheduling longer time slots.

The first and second capability information c1 #1-3, c2 #4-5 comprises static or dynamic parameters describing corresponding properties of links or network entities of the communications network CN.

The apparatus 100 comprises determining means to determine 108 a pre-schedule PS based on the plurality of cyclic data stream parameters cp #1, cp #2, the associated QoS requirements QoS #1, QoS #2, the first network capability information ci1 #1-3, and the second capability information ci2 #4-5.

The apparatus 100 comprises configuring means to configure 110 at least one network entity SCHED #1, NE #1-6 of the communications network CN based on the determined at least one pre-schedule PS. According to an example, the configuring 110 comprises the transmission of at least a part of the pre-schedule PS.

The pre-schedule PS comprises at least one gate control list associated with a network entity NE #1-4 serving at least one of the wired links 11, 12, 13 of the communications network CN. Prioritization of data transmission is done on an egress port of the respective network entity NE #1-4 serving the respective wired link 11-13. Transmission is decided based on a Transmission Selection Algorithm TSA. If the data from a particular queue is selected then the corresponding gate will be opened to transmit the data. Gate opening events are determined by the gate control list. Therefore, a coordination between different data streams is ensured and a protection window is provided to ensure that high priority data has guaranteed access to the network at a specific instant in time. A transmission of a specific traffic class is allowed over a specific period of time.

According to an example, the pre-schedule PS comprises at least an expected cyclic traffic amount per time unit and per wireless link 14, 15 for a scheduler entity SCHED #1 configured to schedule at least one network entity NE #4-6 serving at least one of the wireless links 14, 15 of the communications network CN. Therefore, the scheduler entity SCHED #1 is able to exclusively pre-reserve an amount of radio resources in order to online-schedule the packets associated with the pre-scheduled cyclic data streams.

According to an example, the pre-schedule PS comprises the gate control list for the at least one wired links 13 of the network entity NE #4, which is in particular being termed network translator, and the expected cyclic traffic amount per time unit and per wireless link 14, 15 for the scheduler entity SCHED #1. The scheduler entity SCHED #1 is configured to schedule the network translator entity NE #4 serving at least one of the wireless links 14, 15 associated with the network translator entity NE #4. The at least one gate control list is used by the network entity NE #4 to serve the wired link 13.

According to a logical bridge concept, the network segment seg #2 represents a single TSN node. Accordingly, each individual 5G node NE #4-6 also has a translator to act as a TSN node to the outside world. Consequently, the network entities NE #5 and NE #6 also have translators to the applications app #1,2,3 (although in this case they have no function in terms of scheduling, as the links to the apps are not scheduled).

In order to find an optimal schedule for an end-to-end cyclic data stream over a heterogeneous network, one must jointly optimize all streams over the network entities. The network is a time-triggered system, where the transmit time of each frame can be triggered precisely—in the endpoint application, as well as at every network entity—based on a common time shared among all network entities.

Scheduling is coarsely grouped into two classes: The first class schedules on a per-frame level. For each frame that arrives at one network entity, the scheduler decides when to schedule the frame. We refer to this scheduling as "online scheduling". The second class provides the pre-schedule PS including resources before the respective frame arrives at the network entity based on knowledge about frame arrival, for example for industrial applications, where communication is executed in deterministic cycles. The pre-schedule is determined in advance; we refer to it as "offline scheduling". This description is dealing with the latter case of pre-configured schedules, the pre-schedule PS.

The provided framework provides the user or application with a set of transmission time offsets as part of the pre-schedule PS that determines which network node must reserve resources for which frame. This configuration can then be translated into or comprises the respective gate control list for TSN network entities, or the respective resource allocation in the 5G system. For the 5G system, such a pre-configured schedule is not determined on a low level (i.e. reservation of single resource elements on the physical layer), due to uncertainty of the channel. Hence, the 2-stage approach is used. First, based on a suitable estimation of the channel, the pre-schedule PS is determined to reserve the respective time slots. Second, an online scheduler SCHED #1 determines on a per-frame level the precise resource assignments on the physical layer, as.

This concept is also adopted in framework for a system of TSN bridges and 5G virtual bridges, as shown in FIG. 6. For the TSN system, the end-to-end scheduler can directly schedule each frame, such that the gate control list can be determined. In the 5G case, first, the pre-schedule PS comprises a schedule based on an approximation of the available transmission resources. This pre-schedule PS is then used in an online 5G MAC scheduler as the scheduler SCHED #1 to assign specific resources on the wireless link. In order to operate such an end-to-end scheduling, there capability information from the bridges and the configuration of available interfaces is provided. For TSN bridges or network translator entities, the gate control list is determined externally. The network translator entity applies the gate control list to its egress ports of the bridge via a remote configuration protocol.

Advantageously, delays and bitrate per user and cyclic data stream remain constant over time, based on which the pre-schedule can be computed. A possible example for implementation exposes the capability information of the 5GS bridge in the sense of the network translator entity. This information can include buffer status, link quality, served users, experienced delays, etc. and can be made available at the TSN AF (TSN Application Function) to be exposed over the existing connection to the outer TSN network control plane. In another example, UE specific parameters such as delays inside the UE (between DS-TT and UE AN), delays from the UE to NW-TT, propagation delays or other delays, the channel/link quality, the packet delay budget, the QoS Flows, etc. can be either reported by the UE and sent to the TSN-AF or measured between DS-TT and NW-TT. These values are reported to TSN-AF, where these values are conveyed to the TSN network. The scheduler could then for example be placed outside of the TSN AF.

According to an example, TSCAI (TSC Assistance Information) is transmitted from a Core Network (CN) to the gNB in the sense of the scheduler SCHED #1. The sequence of the former transmission is as follows: from the TSN-AF to a Session Management Function (SMF), and then to the gNB in the sense of the scheduler SCHED #1. TSN AF is responsible for obtaining PSFP (IEEE 802.1Q) and creating containers per stream or for a plurality of streams. The SMF append QoS flow and burst periodicities and sends the container to gNB The SMF maps the burst/periodicity arriving from the from a TSN clock to the 5G clock. Afterwards, a User Plain function (UPF) updates the SMF if there is a mismatch by updating a cumulative rateRatio. Based on the latter value, the SMF will correct the TSCAI and send it back to the gNB.

According to an example, the capability information comprises at least one of the following delay measurements: 5GS independentDelayMin, independentDelayMax and txPropagationDelay.

Additionally, reporting to the 5GS in the sense of the scheduler entity SCHED #1 comprises:
  Report the bridge information of 5GS Bridge om the sense of the network translation entity to TSN network after PDU session establishment;
  Map TSN stream requirements obtained from TSN network to 5GS QoS information (e.g. 5QI, TSC Assistance Information) of a QoS Flow in corresponding PDU Session for efficient time-aware scheduling;
  Capabilities of 5GS Bridge as defined in 802.1Qcc like 5GS Bridge delay per port pair per traffic class, including 5GS Bridge delay (dependent and independent of frame size, and their maximum and minimum values: independentDelayMax, independentDelayMin, dependentDelayMax, dependentDelayMin), ingress port number, egress port number and traffic class, and/or Propagation delay per port (txPropagationDelay), including transmission propagation delay, egress port number.

The TSN AF is responsible to receive the bridge information of 5GS Bridge from 5GS, as well as register or update this information to the TSN network.

According to an example, the apparatus 100 is arranged outside the TSN-AF and connected with an interface to the TSN AF from outside. The TSN AF is internally connected to the NW-TT (Network-Side TSN Translator).

According to an example, the apparatus 100 is split into two parts, a part inside of the TSN-AF and connected to the outside TSN network segment. A second part of the apparatus 100 is arranged outside the TSN-AF and connected to the inside part. The connections are arranged between CNC (CNC: Centralized Network Configuration) and TSN AF.

The communications network CN is considered in a joint fashion. With growing network size, this can become a computationally intensive task. Hence, problem relaxations or heuristics can be applied in order to find solutions in feasible computation time. Furthermore, optimization targets can be applied to different network segments to reduce the problem set and account for network-specific characteristics, as exemplified in the following.

Figure 2:
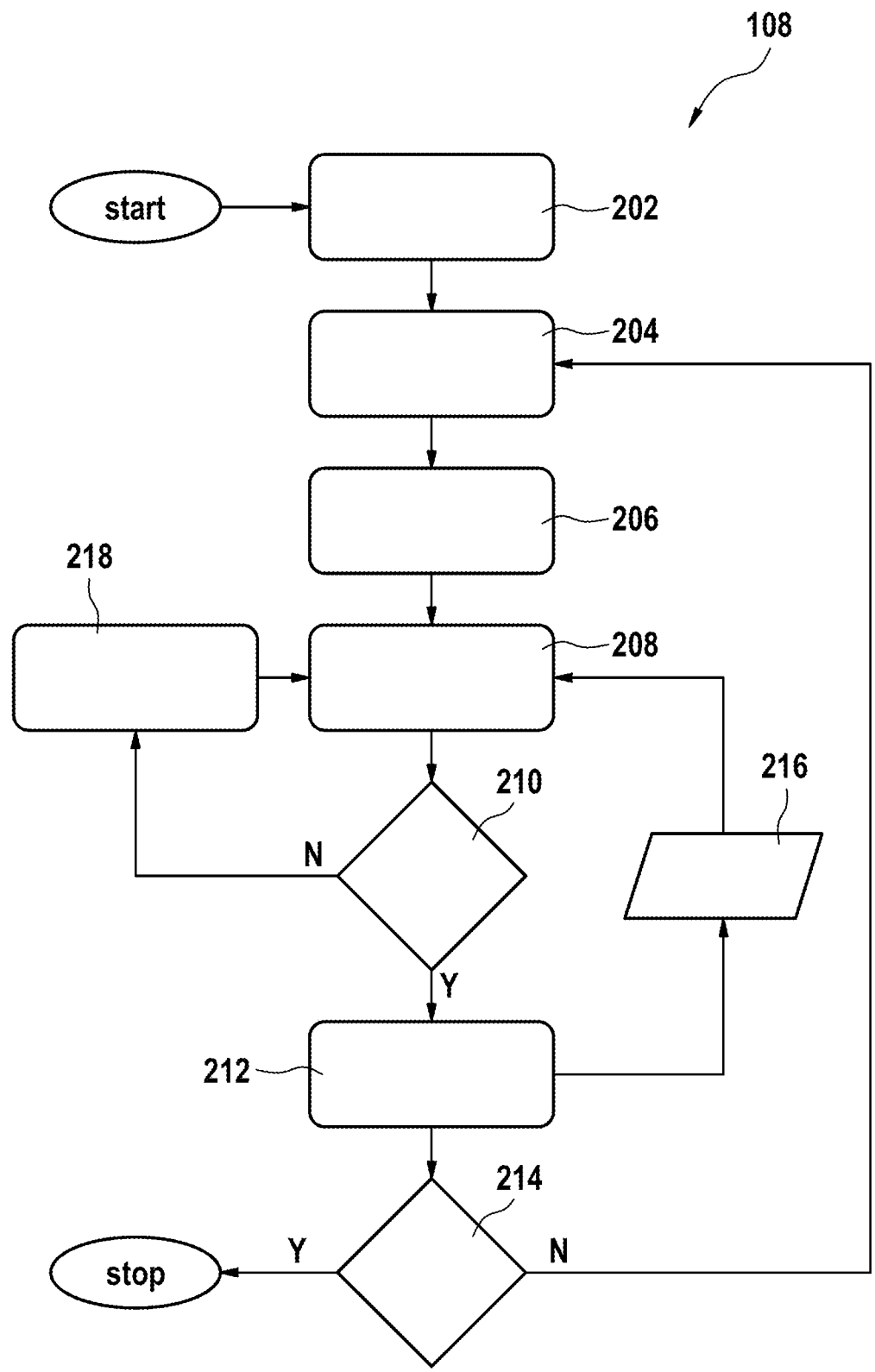
FIGS. 2, 3 and 4 each depicts schematically a flow diagram.

FIG. 2 depicts a schematic flow diagram of the step 108 of FIG. 1. Determining means are provided to read 202 the first and second capability information. For example, the first and second capability information comprises at least one of the following node capabilities including a present status of the respective node, link capabilities including a present status of the respective link.

The determining means to determine the pre-schedule comprises selecting means to select 204 successively at least one segment of the communications network based on the first network capability information, and the second capability information. The selection 204 therefore represents a selection of a subnetwork segment. The idea is to split the network into segments of subnetworks that are optimized iteratively. This allows for a significantly faster calculation of feasible solutions that could be not globally optimal. At least one selected network segment shows distinctive characteristics from the rest of the network. This can be either due to different underlying networking technologies in the segments, or due to influences from present traffic.

For example, the firstly selected segment seg #2 comprises the wireless links, and the second segment seg #1 comprises the wired links.

In another example, the firstly selected segment seg #3 is selected as the links l3 and l4 have a present usage above average.

In yet another example, the firstly selected segment seg #3 is selected as the links l3 and l4 provide a reduced bandwidth below average.

Selection means are provided to selected 206 at least one optimization target. Depending on the configuration of the communications network, there are multiple optimization targets that can be formulated to solve the constraint problem. Examples of the at least one optimization target comprise:
  Minimize the worst case end-to-end latency stream(i).delay;
  Minimize per-link latency for each packet stream(i).packet(j).delay([link(l)]);
  Minimize the worst-case end-to-end jitter stream(i).Δdelay;
  Maximize utilization of 5G link, i.e. maximize the sum of the rate link(l).maxRate(t, b) over all 5G links for all resource blocks B; and
  Maximize the supported number of users.

Adjustment means are provided to adjust 208 constraints for the selected segment of the communications network.

Determining means 210 are provided to determine whether the selected constraints can be satisfied by the selected segment of the communications network.

If the selected constraints cannot be satisfied by the selected segment, determining means determine 218 a solution to the conflict, for example by adjusting at least one constraint and/or at least one optimization target.

If the selected constraints can be satisfied by the selected segment, determining means determine 212 at least one preliminary instance of the pre-schedule for the selected one of the segments of the communications network based on the plurality of cyclic data stream parameters, the associated QoS requirements, and the network capability information associated with the first segment. In particular, the determination 212 comprises determining a solution that optimizes chosen targets, for example offsets associated with links of network entities.

For example, the constraints define the set of possible scheduling realizations that are feasible. The constraints are defined for the heterogeneous communication network consisting of TSN and TSN-over-5G sub-networks. For example, the pre-schedule can be determined via 3 types of input parameters: i.e. the network model and configuration of the given communications network in form of the respective capability information, the parameters and configuration of the i-th stream in the communications network in form of the cyclic data stream parameters, with $l=1, 2, \ldots, S$ and S being the total number of cyclic data streams, and the user requirements per cyclic data stream in form of the associated QoS parameter.

Figure 5:
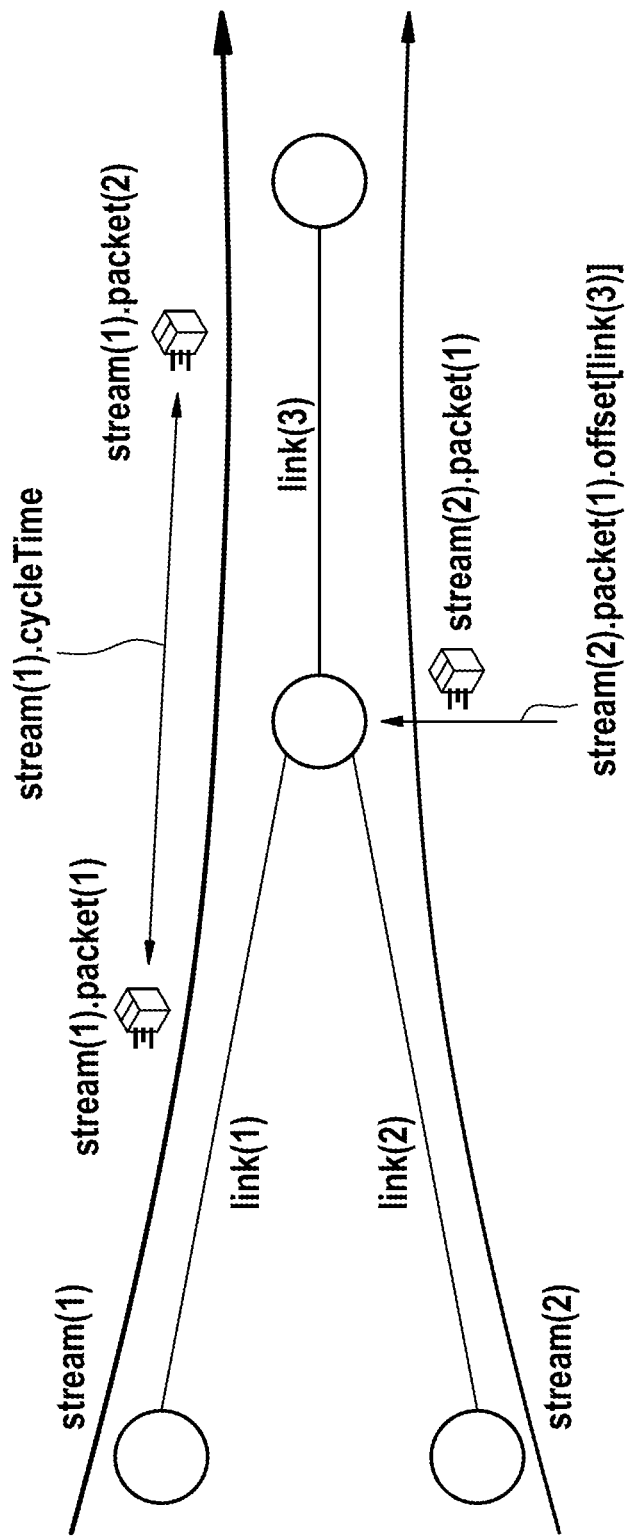
FIG. 5 depicts schematically packets of a respective cyclic data stream.

The task of the apparatus is to determine the pre-schedule for the planned packets at each hop in the communications network. For example, the pre-scheduling can be uniquely defined by the transmission offset $\tau_{i,j,l}$ for each stream $i=1 \ldots S$, each packet $j=1 \ldots P_i$ of that stream, and each link $l=1 \ldots L_i$ the packet travels through, as shown in FIG. 5.

For one of the links link(l), $l=1 \ldots L$, the at least one capability information comprises at least one of:
  a type of link (5G, TSN, etc.): link(l).type;
  an available bandwidth on each link: link(l).maxRate; and
  a transmission delay per link: link(l).delay.

For one of the cyclic data streams stream(i), the at least one cyclic data stream parameter comprises at least one of:
  a network configuration: Number of links: link(l);
  a frame arrival time (e.g. as cycle time): stream(i).cycleTime; and
  a payload per frame: stream(i).packetSize.

For one of the cyclic data streams stream(i), the at least one QoS parameter associated with the at least one cyclic data stream parameter comprises at least one of:
  a target end-to-end delay over network: stream(i).delay;
  a target end-to-end jitter: stream(i).Δdelay; and
  a target packet error rate: stream(i).errorRate.

An updating means is provided to update 216 at least the offsets determined in step 212.

The constraints are determined based on the capability information. In yet another example, the capability information represents the constraints. The constraints can be grouped into general network constraints, and technology-specific constraints, as in this case TSN and 5G.

Network constraints comprise at least one of the following:
  Frame constraint: For each stream $i=1 \ldots S$, its frames $j=1 \ldots P$ must have a transmission offset stream(i).frame(j) that is positive and scheduled within its cycle time stream(i).cycleTime;
  Transmission order: Each frame in the communications network is transmitted at the next link link(l) after it has been fully received beforehand at the preceding link link(l−1):
stream(i).packet(j).offset[link(l−1)]<stream(i).packet(j).offset[link(l)];
  End-to-end delay: Each frame in the communications network has a delay budget within this frame and has to be delivered to the respective endpoint:
stream(i).packet(j).offset[link(Li)]−stream(i).packet(j).offset[link(1)]<stream(i).delay.

Additionally, more requirement-based constraints, e.g. on the jitter stream(i).Δdelay or the packet loss stream(i).errorRate can are defined per stream. Constraints on the delivery order can be applied as well, e.g. if frames have to be transported in bursts.

TSN constraints comprise at least one of the following:
Single link usage: Each wired TSN link (link(l).type=TSN) is exclusively used by a single frame at the same time. Hence we must ensure that any two packets stream(i).packet(j) in the network do not interfere on the same link, i.e. we must ensure to schedule exclusive access for each frame;
Well-defined windows. In the wired TSN segment, each frame is not scheduled individually, but rather based on their traffic class. TSN supports up to 8 traffic classes that group frames of different streams with the same or similar requirements. If the pre-scheduled packets belong to a single traffic class, then this constraint ensures that the respective traffic class gate in the gate control list (GCL) is opened at the respective egress port;
Handling constraint of multiple traffic classes with concurrent access to the link;
ingress filtering; and
queuing behavior.

Radio domain constraints comprise at least one of the following:
transmission opportunities: Unlike in Ethernet-based systems where frames can be transmitted at arbitrary points in time, frames in the radio domain can only be sent at specific discrete points in time. These transmission opportunities are configurable, but usually fixed per stream during operation, and depend on the transmission time interval (TTI):

$$\text{stream}(i) \cdot \text{packet}(j) \cdot \text{offset}[\text{link}(l)] = n \cdot T_{TTI},$$

$$n \in \left\{1, 2, \ldots, \left\lfloor \frac{T}{T_{TTI}} \right\rfloor\right\}$$

for link(l).type=5G.

transmission resources: Unlike in Ethernet systems, frames in wireless systems are not only scheduled over time, but also—depending on the technology—over frequency, codes and antennas. In case of 5G we are considering time and frequency here, which allows to transmit frames concurrently over different frequencies. In contrast to the link-dependent constant rate link(l).maxRate in Ethernet links, we take into account dynamic transmit rates over time t and over the frequency b, due to channel variations, which is also different for each user i (i.e. stream) in the communications network. Hence, we use a different notation quantifying the transmission rate per time-frequency resource block with the respective dependencies: link(l).maxRate(t, b, i). The total rate per TTI for the wireless links is constraint by the number of total supported resource blocks B. Since the behavior of maxRate(t, b, i) is highly dynamic, we rely on assumptions and estimations on the channel. That is a reason why a 2-stage scheduling method comprising the determination of the pre-schedule and determining an online-schedule based on the pre-schedule is applied.

The determination of the pre-schedule based on constraints in form of the capability information is exemplified in the following. There exist multiple options on how to derive the pre-schedule based on the capability information. Possible solver frameworks are e.g. (Mixed-)Integer Linear Programming ((M)ILP), Constraint Programming (CP), or Satisfiability Module Theories (SMT). In terms of optimality, different approaches are conceivable:

No optimization: Based on the constraints, one can derive a schedule meeting all necessary requirements. Usually there are either many solutions or no solution. The constraints are hence only used to determine if satisfiability of the scheduling problem is achievable or not;

Single optimization: It is possible to formulate a single optimization goal, i.e. a certain value that should be minimized or maximized while meeting the constraints. For example, minimizing the sum of all worst-case end-to-end latencies for all streams is such an optimization goal:

$$\min \sum_{i \in 1 \ldots S} \text{stream}(i) \cdot \text{delay}$$

Multiple optimizations. Optimizing multiple parameters at once is usually not directly applicable to constraint-based problems. However, it is possible to formulate a cost function based on multiple parameters, which can then be minimized or maximized. Exemplary, minimizing end-to-end latency and jitter are two optimization goals that can be considered together by considering a cost function F (·):

$$\min \sum_{i \in 1 \ldots S} F(\text{stream}(i) \cdot \text{delay} \cdot \text{stream}(i) \cdot \Delta\text{delay})$$

A determining means is provided to determine 204 whether all segments have been visited for determining the respective preliminary schedule. If the affirmative, the preliminary pre-schedule is determined to be the final pre-schedule. If further segments of the communications network are waiting for determination of a respective preliminary pre-schedule, the procedure continues with step 204.

The method performs well for properly chosen network segments. In case of a TSN and TSN-over-5G implementation as exemplified in FIG. 1, the information to determine a proper segmentation can easily be extracted, as all network participants provide information about the network status and node capabilities to the apparatus 100 of FIG. 1. Using these input parameters, the centralized apparatus determines suitable segmentation of the network and deploys a configuration to the network in the sense of the pre-schedule.

A possible approach would be to first investigate the available bandwidth and the required bandwidth by all cyclic data streams on each network entity. The more users have to share the same link, the more the pre-scheduling affects the overall end-to-end performance. Hence, we select first a set of coherent nodes with the highest utilization in the network. Then, we determine an optimization target for this segment and adjust the constraints. For example, a new latency constraint for one of the segments is set, that of course must be lower than the streams end-to-end latency requirement stream(i).delay. We can now optimize this sub-network and determine the transmission offsets of the cyclic data streams passing that link. Subsequently, we iteratively continue to solve the offsets on all the remaining links in the communications network.

There is a chance that the schedule is infeasible after a subnetwork has been pre-determined, i.e. there are scheduling conflicts that do not meet the constraints. There are two options in this case, either a different segmentation is determined, or the constraints for the subnetwork can be re-adjusted. This does not happen frequently, otherwise this is an indication that the segmentation is not chosen properly, or in general not well applicable to the considered communications network. The more heterogeneous the network is, the better this approach will work.

Figure 3:
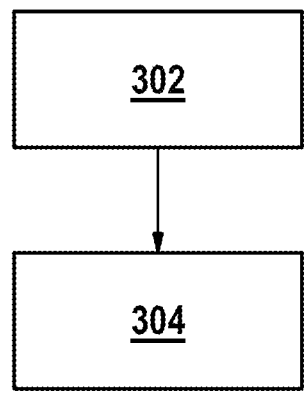

FIG. 3 depicts a schematic flow diagram. The selection means to select the firstly selected segment comprises: determining 302 a plurality of current usages associated with the wired and wireless links based on the provided first and second capability information; and determining 304 the first selected segment comprising a plurality of connected ones of the links with the associated current usage above a usage threshold.

Figure 4:
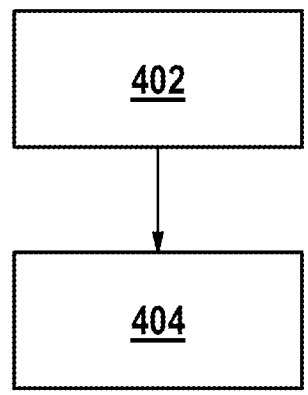

FIG. 4 depicts a schematic flow diagram. The selection 204 of the firstly selected segment comprises: determining 402 a plurality of bandwidths of the wired and wireless links based on the provided first and second capability information; and determining 404 the firstly selected segment comprising a plurality of connected ones of the links with the associated bandwidths below a bandwidth threshold. After obtaining a resource-efficient solution—still maintaining some upper bound on the latency for the selected segment—has been found, the rest of the network can be optimized for lowest end-to-end latency given the pre-scheduled segment.

FIG. 5 depicts schematically that the packets of the respective cyclic data stream are scheduled by the offset at each link in the communications network. For example, summarizing the offsets along a selected path through the communications networks allows to check, whether an associated QoS parameter in terms of latency can be fulfilled or not.

The invention claimed is:

1. A method comprising
receiving (102) a plurality of cyclic data stream parameters (cp #1, cp #2) and associated QoS requirements (QoS #1, QoS #2), wherein at least one of the plurality of stream parameters (cp #1, cp #2) characterizes at least a frame arrival of an associated cyclic data stream and associated communication endpoints (App #1, App #2, App #i) of a communications network (CN);
receiving (104) first capability information (ci1 #1-3) characterizing a capability of respective wired links (l1, l2, l3) of the communications network (CN);
receiving (106) second capability information (ci2 #4-5) characterizing a capability of respective wireless links (l3, l5) of the communications network (CN);
determining (108) a pre-schedule (PS) based on the plurality of cyclic data stream parameters (cp #1, cp #2), the associated QoS requirements (QoS #1, QoS #2), the first network capability information (ci1 #1-3), and the second capability information (ci2 #4-5); and
configuring (110) at least one network entity (SCHED #1, NE #1-6) of the communications network (CN) based on the determined at least one pre-schedule (PS).

2. The method according to claim 1, wherein determining (108) the pre-schedule (PS) comprises
selecting (204) successively at least one segment (seg #1-3) of the communications network (CN) based on the first network capability information (ci1 #1-3), and the second capability information (ci2 #4-5);
determining (212) at least one preliminary instance of the pre-schedule (PS) for the selected one of the segments (seg #1-3) of the communications network (CN) based on the plurality of cyclic data stream parameters (cp #1-2), the associated QoS requirements (QoS #1-2, and the network capability information (ci) associated with the first segment (seg #1-3).

3. The method according to claim 2, wherein the firstly selected segment (seg #2; seg #1) comprises the wireless or the wired links (l4-l5; l1-3), and wherein the second segment (seg #1; seg #2) comprises the wired or the wireless links (l1-3; l4-5).

4. The method according to claim 2, wherein the selection (204) of the firstly selected segment (seg #1-3) comprises:
determining (302) a plurality of current usages associated with the wired and wireless links (l1-5) based on the provided first and second capability information (cp1, cp2);
determining (304) the first selected segment (seg #1-3) comprising a plurality of connected ones of the links (l1-5) with the associated current usage above a usage threshold.

5. The method according to claim 2, wherein the selection (204) of the firstly selected segment (seg #1-3) comprises:
determining (402) a plurality of bandwidths of the wired and wireless links (l1-l5) based on the provided first and second capability information (cp1, cp2);
determining (404) the firstly selected segment (seg #1-3) comprising a plurality of connected ones of the links (l1-5) with the associated bandwidths below a bandwidth threshold.

6. The method according to claim 1, wherein the pre-schedule (PS) comprises at least one gate control list associated with a network entity (NE #1-4) serving at least one of the wired links (l1, l2, l3) of the communications network (CN).

7. The method according to claim 1, wherein the pre-schedule (PS) comprises at least an expected cyclic traffic amount per time unit and per wireless link (l4, l5) for a scheduler entity (SCHED #1) configured to schedule at least one network entity (NE #4-6) serving at least one of the wireless links (l4, l5) of the communications network (CN).

8. The method according to claim 6, wherein the pre-schedule (PS) comprises the at least one gate control list for the at least one wired links (l3) of a network translator entity (NE #4) and the expected cyclic traffic amount per time unit and per wireless link (l4, l5) for the scheduler entity (SCHED #1) configured to schedule the network translator entity (NE #4) serving at least one of the wireless links (l4, l5) associated with the network translator entity (NE #4).

9. An apparatus (100) comprising
receiving means to receive (102) a plurality of cyclic data stream parameters (cp #1, cp #2) and associated QoS requirements (QoS #1, QoS #2), wherein at least one of the plurality of stream parameters (cp #1, cp #2) characterizes at least a frame arrival of an associated cyclic data stream and associated communication endpoints (App #1, App #2, App #i) of a communications network (CN);
receiving means to receive (104) first capability information (ci1 #1-3) characterizing a capability of respective wired links (l1, l2, l3) of the communications network (CN);
receiving means to receive (106) second capability information (ci2 #4-5) characterizing a capability of respective wireless links (l3, l5) of the communications network (CN);
determining means to determine (108) a pre-schedule (PS) based on the plurality of cyclic data stream parameters (cp #1, cp #2), the associated QoS requirements (QoS #1, QoS #2), the first network capability information (ci1 #1-3), and the second capability information (ci2 #4-5); and configuring means to configure (110) at least one network entity (SCHED #1, NE #1-6) of the communications network (CN) based on the determined at least one pre-schedule (PS).

10. The apparatus (100) according to claim 9, wherein the determining means to determine (108) the pre-schedule (PS) comprises selecting means to select (204) successively at least one segment (seg #1-3) of the communications network (CN) based on the first network capability information (ci1 #1-3), and the second capability information (ci2 #4-5);

determining means to determine (212) at least one preliminary instance of the pre-schedule (PS) for the selected one of the segments (seg #1-3) of the communications network (CN) based on the plurality of cyclic data stream parameters (cp #1-2), the associated QoS requirements (QoS #1-2, and the network capability information (ci) associated with the first segment (seg #1-3).

11. The apparatus (100) according to claim 10, wherein the firstly selected segment (seg #2; seg #1) comprises the wireless or the wired links (l4-l5; l1-3), and wherein the second segment (seg #1; seg #2) comprises the wired or the wireless links (l1-3; l4-5).

12. The apparatus (100) according to claim 10, wherein the selecting means to select (204) the firstly selected segment (seg #1-3) comprises:

determining means to determine (302) a plurality of current usages associated with the wired and wireless links (l1-5) based on the provided first and second capability information (cp1, cp2);

determining means to determine (304) the first selected segment (seg #1-3) comprising a plurality of connected ones of the links (l1-5) with the associated current usage above a usage threshold.

13. The apparatus (100) according to claim 10, wherein the selection (204) of the firstly selected segment (seg #1-3) comprises:

determining means to determine (402) a plurality of bandwidths of the wired and wireless links (l1-l5) based on the provided first and second capability information (cp1, cp2);

determining means to determine (404) the firstly selected segment (seg #1-3) comprising a plurality of connected ones of the links (l1-5) with the associated bandwidths below a bandwidth threshold.

14. The method according to claim 9, wherein the pre-schedule (PS) comprises at least one gate control list associated with a network entity (NE #1-4) serving at least one of the wired links (l1, l2, l3) of the communications network (CN).

15. The method according to claim 9, wherein the pre-schedule (PS) comprises at least an expected cyclic traffic amount per time unit and per wireless link (l4, l5) for a scheduler entity (SCHED #1) configured to schedule at least one network entity (NE #4-6) serving at least one of the wireless links (l4, l5) of the communications network (CN).

16. The method according to claim 14, wherein the pre-schedule (PS) comprises the gate control list for the at least one wired links (l3) of a network translator entity (NE #4) and the expected cyclic traffic amount per time unit and per wireless link (l4, l5) for the scheduler entity (SCHED #1) configured to schedule the network translator entity (NE #4) serving at least one of the wireless links (l4, l5) associated with the network translator entity (NE #4).

* * * * *